United States Patent
Guy

(10) Patent No.: US 6,778,729 B1
(45) Date of Patent: Aug. 17, 2004

(54) DEVICE AND METHOD FOR OPTICAL SIGNAL SWITCHING

(75) Inventor: James K. Guy, Mesa, AZ (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/551,030

(22) Filed: Apr. 17, 2000

(51) Int. Cl.[7] .............................................. G02B 6/26
(52) U.S. Cl. .............................. 385/22; 385/16; 385/25
(58) Field of Search .................. 385/16–25; 200/11 R, 200/316

(56) References Cited

U.S. PATENT DOCUMENTS

| | | |
|---|---|---|
| 3,599,115 A | 8/1971 | Beezley |
| 3,895,612 A | 7/1975 | Keely et al. |
| 4,088,387 A | 5/1978 | Lewis |
| 4,753,501 A * | 6/1988 | Battle |
| 4,896,935 A * | 1/1990 | Lee |
| 5,031,986 A | 7/1991 | Mori |
| 5,317,659 A * | 5/1994 | Lee ............................ 385/22 |
| 5,487,619 A | 1/1996 | Winebrenner |
| 5,590,227 A | 12/1996 | Osaka et al. |
| 5,602,948 A | 2/1997 | Currie |
| 5,611,009 A | 3/1997 | Pan |
| 5,621,829 A | 4/1997 | Ford |
| 5,631,625 A | 5/1997 | Moergelin et al. |
| 5,691,696 A | 11/1997 | Mazies et al. |
| 5,877,681 A | 3/1999 | Williams et al. |
| 5,920,667 A * | 7/1999 | Tiao et al. ..................... 385/22 |
| 6,002,819 A | 12/1999 | Saito et al. |
| 6,108,467 A * | 8/2000 | Naraoka et al. ............... 385/20 |
| 6,335,993 B1 * | 1/2002 | Takahashi ..................... 385/25 |
| 6,380,822 B1 * | 4/2002 | Lindgren ..................... 333/106 |

FOREIGN PATENT DOCUMENTS

| | | |
|---|---|---|
| FR | 88 09086 | 1/1990 |
| JP | 53160882 | 7/1980 |
| JP | 55070088 | 12/1981 |
| JP | 10150834 | 12/1999 |
| WO | WO 99/39135 | 8/1999 |

OTHER PUBLICATIONS

Fiber–Optic Data Distribution dated Sep. 4, 1980 by H.R. Stigdon in IBM Technical Disclosure Bulletin, vol. 23 No. 4.

* cited by examiner

*Primary Examiner*—Hemang Sanghavi
(74) *Attorney, Agent, or Firm*—Harness Dickey & Pierce P.L.C.

(57) ABSTRACT

An opto-mechanical switching device for selectively switching an optical input between a plurality of output fibers. The opto-mechanical switching device includes a re-directing fiber adapted to receive the optical input. The re-directing fiber is disposed within a re-directing fiber housing. The re-directing fiber housing is selectively positionable via a stepper motor to transmit the optical input to a predetermined one of the plurality of output fibers. A method for switching an optical input between a plurality of output fibers is also provided.

18 Claims, 1 Drawing Sheet

DEVICE AND METHOD FOR OPTICAL SIGNAL SWITCHING

TECHNICAL FIELD

The present invention generally relates to optical switches and more particularly to an optical switch and a switching method therefor for the switching of an optical signal through the use of a selectively positionable re-directing fiber.

BACKGROUND OF THE INVENTION

BACKGROUND ART

In applications involving the transmission of optically encoded data through fiber optic cables, there is frequently a need to selectively switch data between an input fiber and two or more output fibers. A simple way to provide optical fiber switching has been to perform the switching manually. This may be accomplished, for example, by manually manipulating a switchboard panel. This solution, however, is limited to applications where the number of output fibers to be switched between is relatively small and a relatively slow switching time is acceptable.

Switching applications that require more rapid response and/or a relatively large number of output fibers typically employ an automated switching device. One kind of automated switching device is an opto-mechanical switching device. Opto-mechanical switching devices typically employ a lensed input fiber which is mechanically moved across a bank of lensed output fibers. Data is transferred when the lensed input fiber is aligned with a lensed output fiber.

Opto-mechanical switching devices typically have a switching response on the order of 10 to 50 ms, which is far better than that which is possible for a manually operated switchboard panel. Furthermore, opto-mechanical switches generally exhibit good cross talk, back reflection and insertion loss characteristics.

One drawback associated with conventional opto-mechanical switches concerns the ease and cost with which they are integrated into a circuit. Generally, the microlenses of a conventional opto-mechanical switch must be aligned to each fiber and testing must be performed to verify that the alignment is proper. In applications requiring relatively large switches, the cost of fiber alignment is a dominant cost and may easily exceed the cost of the switch itself.

One attempt to reduce the costs associated with opto-mechanical switching devices is disclosed in U.S. Pat. No. 5,621,829 entitled "Fiber Optic Switching Device and Method Using Free Space Scanning", the disclosure of which is hereby incorporated by reference as if fully set forth herein. The device of the '829 patent employs a moving reflective mechanism, such as a reflector or a prism, to transfer a collimated light signal from the input fiber to a desired output fiber. This approach, however, has several drawbacks. One drawback associated with the approach disclosed in the '829 patent concerns the efficiency with which light is transmitted from the input fiber to an output fiber. The use of reflective mechanisms typically results in a total internal reflection or loss in efficiency of about 5 to 15 percent for the best reflective surfaces. Losses may be substantially higher for lower quality reflective surfaces, rendering it even more likely that the input signal will not be accurately transmitted to the preselected output fiber.

Another drawback concerns the relative cost of the device disclosed in the '829 patent. Reflective mechanisms, especially those having good quality reflective surfaces, are typically expensive and as such, tend to increase the initial cost of the switching mechanism. Furthermore, periodic maintenance or cleaning of the reflective surface is required to maintain optical performance of the reflective mechanism and ensure maximum light transmission from the input fiber to the preselected output fiber.

SUMMARY OF THE INVENTION

It is one object of the present invention to provide an opto-mechanical switching device which does not require extensive alignment between an input fiber and a plurality of output fibers.

It is another object of the present invention to provide an opto-mechanical switching device which does not require expensive reflective mechanisms for transmitting an optical input to a predetermined output fiber.

It is a more specific object of the present invention to provide an opto-mechanical switching device which employs a re-directing fiber to accurately and efficiently transmit an optical input to a predetermined output fiber.

It is yet another object of the present invention to provide a method for switching an optical signal between a plurality of output fibers using a re-directing fiber.

In one preferred form, the present invention provides an opto-mechanical switching device for selectively switching an optical input between a plurality of output fibers. The opto-mechanical switching device includes a re-directing fiber adapted to receive the optical input. The re-directing fiber is selectively positionable to transmit the optical input to a predetermined one of the plurality of output fibers. A method for switching an optical input between a plurality of output fibers is also provided.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 1:
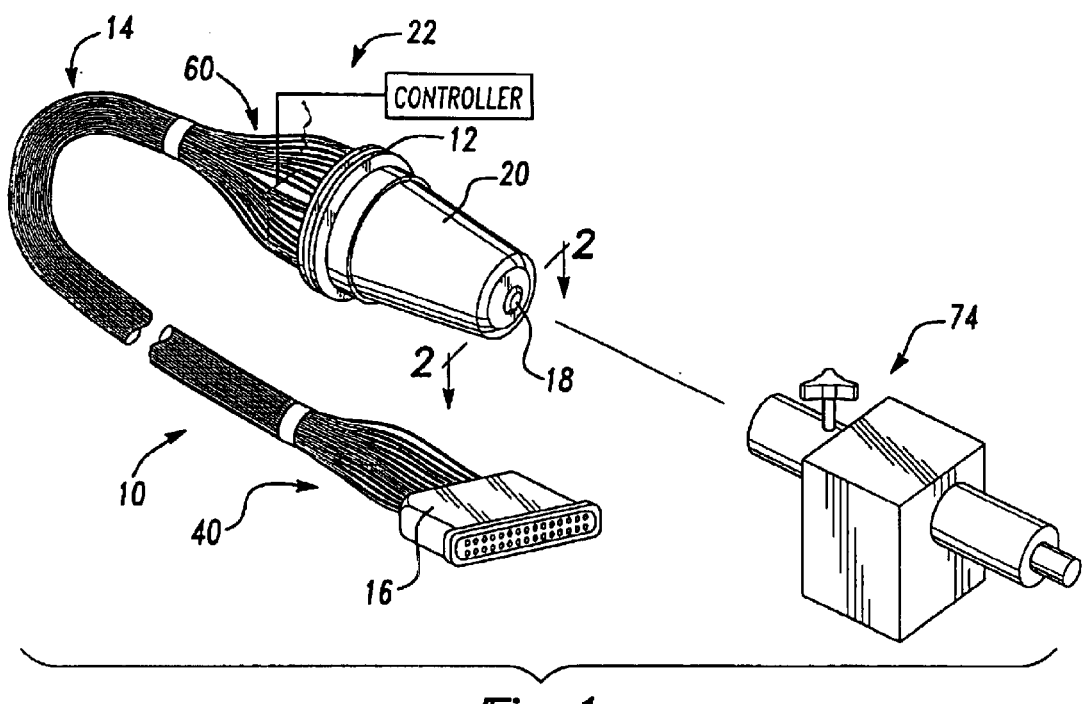
FIG. 1 is a perspective view of an opto-mechanical switching assembly constructed in accordance with a preferred embodiment of the present invention.

With reference to FIG. 1 of the drawings, an opto-mechanical switching device constructed in accordance with the teachings of a preferred embodiment of the present invention is generally indicated by reference numeral 10. Opto-mechanical switching device 10 is shown to include a separator member 12, a plurality of output fibers 14, an output fiber connector 16, a re-directing fiber 18, a re-directing fiber housing 20 and a drive mechanism 22.

Figure 2:
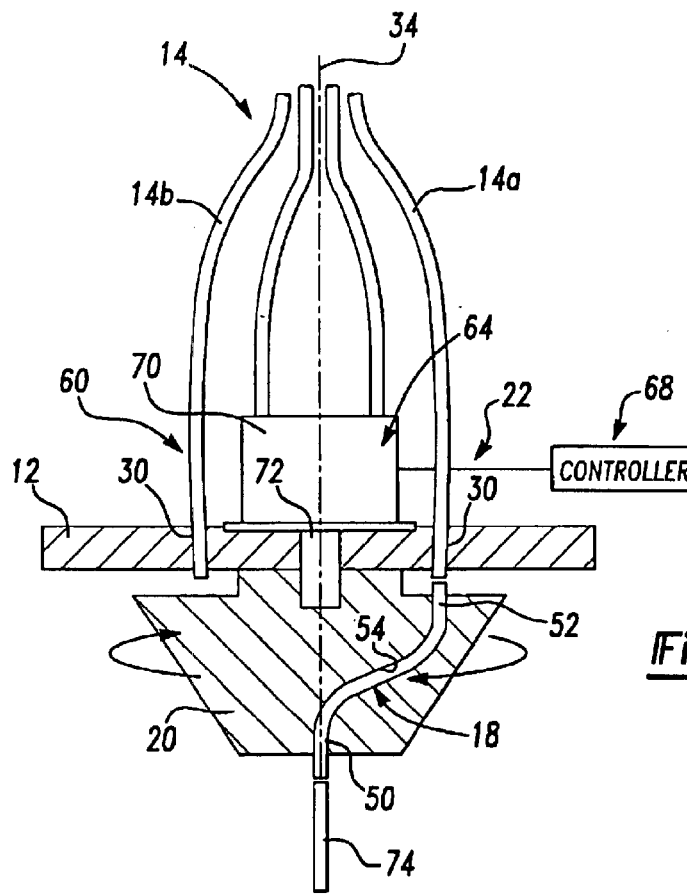
FIG. 2 is a partial sectional view of the opto-mechanical switching assembly of FIG. 1 taken along the line 2—2.

With additional reference to FIG. 2, separator member 12 is shown to include a plurality of holes 30, each of which is sized to receive one of the plurality of output fibers 14. In the particular embodiment illustrated, separator member 12 is an annular plate and the plurality of holes 30 are spaced apart around the circumference of a circle formed concentrically about the central axis 34 of opto-mechanical switching device 10.

The plurality of output fibers 14 are conventional fiber optic cables that are positioned in the holes 30 in the separator member 12 and fixedly coupled thereto by a conventional securing means such as an adhesive. The distal end 40 of the plurality of output fibers 14 is coupled to output fiber connector 16 in a manner that is well known in the art. Output fiber connector 16 permits opto-mechanical switching device 10 to be quickly and accurately coupled to an optical circuit (not shown) without the need for aligning opto-mechanical switching device 10 to fiber optic cable elements of the optical circuit.

Re-directing fiber 18 is shown in the particular embodiment illustrated to include a first portion 50 which is generally coincident with the central axis 34, a second portion 52 which is generally parallel to the first portion 50 and radially outwardly offset therefrom, and a third or central portion 54 which extends between the first and second portions 50 and 52. Re-directing fiber 18 is molded into or otherwise fixedly coupled to re-directing fiber housing 20. Re-directing fiber housing 20 is therefore operable for maintaining the shape of the re-directing fiber 18 as well as protecting the re-directing fiber 18 from contact with foreign objects which would tend to abrade the sides of the re-directing fiber 18.

Drive mechanism 22 is coupled to re-directing fiber 18 and is selectively operable for moving the re-directing fiber such that the second portion 52 of the re-directing fiber 18 is aligned to the proximal end 60 of a predetermined one of the plurality of output fibers 14. In the particular embodiment illustrated, drive mechanism 22 includes a conventional stepper motor 64 and a conventional controller 68. Stepper motor 64 may be a permanent magnet or variable reluctance type stepper motor, with the angular resolution of each step preferably correlating to the angular spacing between the holes 30 in the separator member 12. Stepper motor 64 includes a housing 70 that is fixedly coupled to separator member 12 in a predetermined radial relationship. Stepper motor 64 also includes an output member 72 that is rotatable about the central axis 34. Controller 68 is coupled to stepper motor 64 and causes stepper motor 64 to rotate output member 72 to a predetermined rotational position. Alternatively, drive mechanism 22 may include a conventional servo motor or other rotary actuator which permits a rotational output member to be accurately positioned in a plurality of predetermined radial positions. It will be appreciated that virtually any component that performs the function of precisely rotating the fiber housing 20 to precise angular positions could be used to form the drive mechanism 22.

In operation, an opto-mechanical switching device 10 is mounted in a desired location, an input fiber 74 is aligned to the first portion 50 of the re-directing fiber 18 and the output fiber connector 16 is coupled to a fiber optic circuit. As those skilled in the art will understand, the gap between the input fiber 74 and the first portion 50 of the re-directing fiber 18 as well as the respective gaps between the second portion 52 of the re-directing fiber 18 and the proximal end 60 of the plurality of output fibers 14 are preferably controlled to be both uniform and as small as possible to prevent contact between the ends of the fibers while maximizing signal transmission between the respective fibers. Those skilled in the art will also understand that signal transmission between the respective fibers can be maximized through proper preparation of the ends of the fibers (e.g., trimming the ends perpendicular to the longitudinal axis of the fiber). Input fiber 74 provides an optical input signal that is received by the first portion 50 of re-directing fiber 18. The optical input signal is transmitted through the re-directing fiber 18 where it exits the second portion 52 of the re-directing fiber 18, and then enters the proximal end 60 of a first one of the plurality of output fibers 14 (e.g., output fiber 14*a*). When switching is required, controller 68 causes the stepper motor 64 to rotate re-directing fiber 18 to a precise, predetermined position such that the second portion 52 of the re-directing fiber 18 is aligned to the proximal end 60 of a preselected second one of the plurality of output fibers 14 (e.g., output fiber 14*b*).

Advantageously, this approach does not rely on reflective mechanisms. As such, total internal reflection results in a loss in efficiency of only about 1 percent or less, thus substantially increasing the reliability with which data may be accurately transmitted to an output fiber. Furthermore, as the re-directing fiber housing 20 and the separator member 12 cooperate to align the second portion 52 of the re-directing fiber 18 to the proximal ends 60 of the plurality of output fibers 14, the cost associated with the process of aligning fibers is substantially reduced, with the only necessary field alignment being between the first portion 50 of the re-directing fiber 18 and the input fiber 74.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An opto-mechanical switch for selectively switching an optical input signal from an input fiber optic cable between a plurality of output fiber optic cables, the opto-mechanical switch including a discrete re-directing fiber optic cable that is spaced apart from both the input and output fiber optic cables, the re-directing fiber optic cable being adapted to receive the optical input signal, the re-directing fiber optic cable mounted within a housing, the re-directing fiber optic cable and the housing being selectively positionable to transmit the optical input signal to a predetermined one of the plurality of output fiber optic cables, wherein the re-directing fiber optic cable is distinct from the input fiber optic cable and the output fiber optic cables.

2. The opto-mechanical switch of claim 1, further comprising a separator member for spacing the plurality of output fiber optic cables apart and positioning each of the plurality of output fiber optic cables in a predetermined position.

3. The opto-mechanical switch of claim 2, wherein the separator member spaces the plurality of output fiber optic cables apart around a circumference of a circle.

4. The opto-mechanical switch of claim 3, further comprising a drive mechanism for rotating the re-directing fiber optic cable about a central axis that extends through a center point of the circle.

5. The opto-mechanical switch of claim 4, wherein the drive mechanism includes a stepper motor.

6. The opto-mechanical switch of claim 4, wherein the drive mechanism has a housing that is fixedly coupled to the separator member and an output member that is coupled to the re-directing fiber optic cable.

7. The opto-mechanical switch of claim 4, wherein the re-directing fiber optic cable has a first portion that is generally coincident with the central axis, a second portion that is generally parallel to and radially offset from the central axis, and a third portion that couples the first portion to the second portion.

8. The opto-mechanical switch of claim 1, further comprising an output fiber optic cable connector coupled to the plurality of output fiber optic cables, the output fiber optic cable connector adapted to couple the opto-mechanical switch to an optical circuit.

9. The opto-mechanical switch of claim 1 wherein said input fiber optic cable is displaced from said re-directing fiber optic cable.

10. An opto-mechanical switch comprising:
   a plurality of output fiber optic cables;
   a separator member for spacing the plurality of output fiber optic cables apart and positioning each of the plurality of output fiber optic cables in a predetermined position;
   a drive mechanism; and
   a discrete re-directing fiber optic cable coupled to the drive mechanism and adapted to receive an optical input signal from an input fiber optic cable, the input fiber optic cable being spaced apart from the opto-mechanical switch, and the re-directing fiber optic cable mounted within a housing rotatable by the drive mechanism; and
   wherein the drive mechanism is operable for selectively positioning the housing and the re-directing fiber optic cable such that the re-directing fiber optic cable transmits the optical input signal to a predetermined one of the plurality of output fiber optic cables wherein the re-directing fiber optic cable is independently movable relative to the input fiber optic cable.

11. The opto-mechanical switch of claim 10, wherein the separator member spaces the plurality of output fiber optic cables apart around a circumference of a circle.

12. The opto-mechanical switch of claim 10, wherein the drive mechanism includes a stepper motor.

13. The opto-mechanical switch of claim 10, wherein the drive mechanism has a housing that is fixedly coupled to the separator member and an output member that is coupled to the re-directing fiber optic cable.

14. The opto-mechanical switch of claim 10, wherein the re-directing fiber optic cable has a first portion that is generally coincident with the central axis, a second portion that is generally parallel to and radially offset from the central axis, and a third portion that couples the first portion to the second portion.

15. The opto-mechanical switch of claim 10, further comprising an output fiber optic cable connector coupled to the plurality of output fiber optic cables, the output fiber optic cable connector adapted to couple the opto-mechanical switch to an optical circuit.

16. The opto-mechanical switch of claim 10, wherein said input fiber optic cable is displaced from said re-directing fiber optic cable.

17. A method for switching an optical signal, the method comprising the steps of:
   providing a plurality of output fiber optic cables;
   providing an optical input signal from an input optical fiber cable;
   providing a discrete re-directing fiber optic cable between the plurality of output fiber optic cables and the input optical fiber cable;
   providing the discrete re-directing fiber optic cable within a housing;
   positioning the re-directing fiber optic cable and the housing to transmit the input signal to a predetermined one of the plurality of output fiber optic cables;
   wherein the re-directing fiber optic cable does not contact the output fiber optic cable or the input optical cable.

18. The method of claim 17, wherein in the step of positioning the re-directing fiber optic cable, the re-directing fiber optic cable is rotated to a predetermined radial position.

* * * * *